United States Patent Office 3,150,050
Patented Sept. 22, 1964

3,150,050
EXTRACTION OF ESSENTIAL PERFUME FRAGRANCE COMPONENTS WITH FLUORINATED HYDROCARBONS
Julius Safrin, Jackson Heights, and Edward J. Strobl, New York, N.Y., assignors to Albert Verley & Company, Linden, N.J., a corporation of Illinois
No Drawing. Filed Oct. 28, 1959, Ser. No. 849,132
23 Claims. (Cl. 167—94)

This invention relates to the art of perfumery and is particularly directed to the manufacture of extracts of the products of nature which are utilized by the perfumery industry as the sources of fragrances or odors. This application is a continuation-in-part of our application, Serial No. 763,813 for "Manufacture of Perfumes," filed September 29, 1958, now abandoned. Essentially, a good perfume comprises a solution in a mutual solvent of a blend of concentrates or essences which are extracted from organic products which occur in nature. The perfume may or may not include synthetic aromatic chemicals, but the present invention relates only to the manufacture of the natural perfumery extracts or concentrates.

The perfumery industry is an old and world-wide industry, and the sources of fragrances and odors, while numerous and diverse, constitute commercially a single class of commodities of commerce. All of the essences are concentrates which are extracted from these products of nature and have two necessary properties in common: (1) All dissolve to some extent in ethyl alcohol, and (2) all affect the human olfactory nerves. In general, the odor of a perfume ingredient is pleasant, but many may be classed as distinctive rather than pleasant or unpleasant and some minor ingredients may be definitely unpleasant. In any case, the objective of the perfumer is to choose among the great variety of perfume essences which are available as commodities of commerce and ingeniously combine varying fragrances, scents, aromas, and odors to produce a product which has no purpose other than to please the olfactory nerves of human beings.

In general, it may be said that a perfume of commerce is an alcoholic blend of essential oils which are obtained from flowers, plants, leaves, roots, wood, etc., resinoids, extractions of animal glands, synthetic aromatic chemicals, and isolates. The latter term is used to designate various chemicals which are isolated from raw materials in a condition of relative chemical purity. Isolates are not synthetics but on the other hand do not occur in nature in pure form.

The present invention relates to a new method of extracting perfumery materials in general and to the production of improved perfume materials from plants in particular. The method of this invention is particularly useful and effective when applied to the extraction of the living flowers which are utilized as raw materials in the perume industry. The term "living" is used herein to identify the raw plant materials of the perfume industry which are normally extracted while the metabolic process is continuing or at least before the catabolic process has set in or become appreciably advanced.

It is a matter of common experience that flowers, for instance, do not die immediately upon severance from the plant but continue for a limited period of time to develop and to produce fragrance. This indicates that the metabolic process is continuing in the flower or plant. However, after a certain length of time, depending on the plant specie and the conditions under which it is kept, the metabolic process ceases and the catabolic process sets in. The flower then ceases to generate its fragrance, and as an incident to the catabolic process, usually produces a very disagreeable odor. The method of this invention is particularly applicable to plant material which is living in the sense that the catabolic process has not proceeded to an odor-impairing degree.

The perfumery materials which are commodities of commerce in the perfume industry include raw materials, concretes, and absolutes. The raw material, of course, is the direct product of nature; the concrete is a crude extraction of the product of nature, and the absolute is a carefully prepared alcoholic extraction of the concrete. In extracting perfumery flowers and plant materials, it has been conventional in the past to utilize petroleum ether or benzene as the extractant. After extraction the solvent is distilled off for reuse, leaving the concrete. However, the concretes usually, if not always, contain materials which do not dissolve in ethyl alcohol. Hence, a concrete is carefully esxtracted with ethyl alcohol and the solution filtered in order to remove all components which precipitate. The resulting concentrate after removal of the ethyl alcohol is known as an absolute. These absolutes are the commodities of commerce which the perfume manufacturers blend into the finished perfumes.

The method of the present invention, in its broader aspect, may be applied to the perfumer's raw materials, concretes, and absolutes to obtain perfume concentrates or perfume oils or superior quality. The practice of the method of this invention is particularly advantageous when applied to living plant raw materials such as living flowers because the perfume concentrates or oils produced by the method of this invention seem to have the fresh fragrance of the living plant to a greater degree than the concretes or absolutes which are produced by previously known methods.

This invention is based upon the discovery and determination that the fluorinated hydrocarbons, which are hereinafter more fully described, possess the property of dissolving from perfumery materials the active ingredients which affect the olfactory nerves of human beings. These fluorinated hydrocarbons are in common use as propellents in a great variety of aerosol products including insect sprays, shaving lathers, shampoos, body deodorants, anti-perspirants, and the like.

We are cognizant of the fact that a number of the aerosol products which have been produced in the past have been perfumed to some extent and that various aerosol colognes have been manufactured and sold. However, it has been widely recognized and understood that perfume oils in general are not readily soluble in the fluorinated hydrocarbons. This is fully discussed in an article entitled, "The Perfuming of Aerosols," by Raoul Pantaleoni of the Fine Chemicals Division of E. I. du Pont de Nemours & Co. (Inc.) which was published in the December 1951 issue of the "American Perfumer and Essential Oil Review."

The essence of the idea of the present invention is not to dissolve whole perfume oils in fluorinated hydrocarbons but rather to utilize the limited solvency of fluorinated hydrocarbons for perfume oils to fractionate the perfume oils into two components, one of which is separated and removed from the solution by settling or filtration or any other suitable method. The component or fraction which remains in solution in the fluorinated hydrocarbons is characterized by the distinctive odor of the perfume oil and by concentration of the active nerve stimulating ingredient.

Otherwise expressed, this invention is based on the discovery and determination that the fluorinated hydrocarbons may be used for concentrating the essence of a perfume. For instance, if two equal quantities of fresh flowers are extracted, one with a fluorinated hydrocarbon and the other with petroleum ether, the quantitative yield of concrete from the fluorinated hydrocarbon extract is less than the yield from the petroleum ether extract; but the fluorinated hydrocarbon extract is better for two reasons: (1) It contains as much or more of the natural odor or fragrance, particularly the top notes, and (2) it does not contain as much of the useless components, including components which are undesirable due to their chemical instability. The very high quality of the perfume material extracted by the fluorinated hydrocarbon more than offsets the lesser yield.

The method of this invention is applicable to all of the perfumery materials of commerce including plant raw materials and their extracts, animal glands and their extracts, and the exudates or resins and their extracts. The method is particularly useful when applied directly to living plant material, particularly living flowers such as rose, jasmine, orange flowers, tube rose, mimosa, jonquil, narcissus, lilac, honeysuckle, gardenia, lily of the valley, hyacinth, carnation, etc.

We are also cognizant of the fact that the steps of the process of this invention have been used in the production of a purified pyrethrin, U.S. Patents No. 2,410,101 and No. 2,449,671. However, the method of this invention constitutes a new use of the steps of the processes of the identified patents, which new use is distinguished from the old uses by both the identity of the raw materials and the results attained. Thus, in the method of this invention the fluorinated hydrocarbons which are normally used as aerosol propellents are utilized as selective solvents, not merely to separate components of perfumery materials, but to isolate concentrated fractions which are characterized by the fullness and intensity of the odors.

In extracting perfume oils from plant materials, the use of the fluorinated hydrocarbons instead of the conventional petroleum ether has four distinct advantages:

(1) The fluorinated hydrocarbon extracts the full, natural fragrance of the living plant or flower more truthfully than the petroleum ether.

(2) The petroleum ether extracts a greater amount of albuminous, waxy and fatty substances which tend to deteriorate with time and on exposure with a resultant bad odor or lessened solubility or both.

(3) The petroleum ether must be distilled from the extracted material at a temperature above its boiling point, 30° C. —75° C., which involves the loss of certain fractions of the odoriferous materials. The fluorinated hydrocarbons, on the other hand, are liquid at room temperature only under pressure and hence may be evaporated off at room temperature or a lower temperature.

(4) Petroleum ether itself has an objectionable odor, and traces, which cannot be easily removed, remain in the extracted material. The fluorinated hydrocarbons, on the other hand, may be fully and easily removed from the extracted material. Benzene has all of the bad characteristics of petroleum ether but to a greater degree.

The solvents which are suitable for use in the practice of the process of this invention are generally designated fluorinated hydrocarbons and are generally used as propellents in aerosol packages. A number of these propellents and their uses are described in a publication entitled "Packaging for Profit," copyright 1956, by E. I. du Pont de Nemours & Co. (Inc), Wilmington, Del. These products are sold by the company under its trademark "Freon." These propellents are listed in this publication as follows:

"Freon–11"—trichloromonofluoromethane, $CCl_3F$.
"Freon–12"—dichlorodifluoromethane, $CCl_2F_2$.
"Freon–22"—monochlorodifluoromethane, $CHClF_2$.
"Freon–113"—trichlorotrifluoroethane, $CCl_2FCClF_2$
"Freon–114"—dichlorotetrafluoroethane, $CClF_2CClF_2$
"Freon–115"—monochloropentafluoroethane, $C_2ClF_5$.

There is also now available a cyclic propellent, $C_4F_8$, octafluorocyclobutane, which is designated "Freon–C318" by its manufacturer. The Allied Chemical Corporation also manufactures and markets propellents of this type under its trademark "Genetron 114A." It is to be noted that "Genetron 114A" and "Freon–114" are both dichlorotetrafluoroethanes but have different structural formulae. Another suitable product of this company is "Genetron 142B" which has the formula $CH_3CClF_2$. A similar line of fluorinated hydrocarbon propellents is also marketed by the Penn Salt Company of Philadelphia, Pa., under the trademark "Isotron."

These propellents may be used as solvents either individually or in a mixture. For the purpose of extracting fresh flowers, "Genetron 114A," "Freon–12," and "Freon–114" or their mixtures are preferable. However, the propellents may be selected and blended to constitute solvents of specific characteristics which are suitable for each specific extracting operation.

In many cases, the fluorinated hydrocarbon solvents may be advantageously blended in respect to the specific perfumery material under treatment. In some cases, the yield may be increased as much as 40% by a proper blending of solvents, depending upon the nature of the product under treatment and the nature of the product desired.

In general, the more highly fluorinated compounds are more selective in the sense that they tend to extract the fragrant component of the flower to the exclusion, or partial exclusion, of the inert compounds which normally dissolve in petroleum ether. The less highly fluorinated compounds such as "Freon–11" tend to extract a greater total quantity of material from the flower, but the extraction includes more waxy and inert materials than if the more highly fluorinated compounds are utilized.

If desired, a series of fluorinated hydrocarbon solvents may be used successively on any given perfumery material to extract further fragrance. Either a starting perfumery material may be extracted with one fluorinated hydrocarbon solvent, then the concentrate from the extract treated with another fluorinated hydrocarbon solvent; or the starting perfumery material may be treated with one fluorinated hydrocarbon solvent and the residue treated with the second fluorinated hydrocarbon solvent. Either fractionation technique yields two condensates which may have distinctive odor values.

The process of this invention involves the steps of treating the perfumery material with the fluorinated hydrocarbon propellent which is maintained under sufficient pressure to liquefy said propellent to provide a liquid solvent and separating the liquid solution from that portion of the perfumery material treated which does not dissolve in said solvent. From the point of view of efficiency, the extraction should be conducted under conditions whereby the perfumery material is agitated in the liquid solvent or the liquid solvent is circulated through the perfumery material or both.

The nature of the apparatus used for extraction process is not critical, although the efficiency of the extraction may vary with the construction of the apparatus. All that is necessary is that the fluorinated hydrocarbon propellent be maintained under a pressure at which the propellent is a liquid at the temperature of the extraction. After the extraction the solution may be combined with other solutions or other perfumery materials and packaged in an aerosol package or the fluorinated hydrocarbon may be evaporated from the extracted materials. If desired, the latter operation may be performed at such a rate that the solution is chilled to precipitate waxes and is thereafter filtered to remove the precipitate.

A very pure concrete is obtained by extracting the living flowers with "Freon–114," "Genetron 114A," or "Freon–12" or a mixture of two or more of them at room temperature, then chilling the solution to a low temperature, such as —15° C. (more or less), for three or four hours and filtering out the precipitate. In the extraction of some flowers, the amount of precipitate is substantial, and in the extraction of other flowers, the amount of precipitate is not significant. In any case, the fragrance which remains in the solution after filtration is particularly soluble in a fluorinated hydrocarbon propellent and is therefore highly suitable for use in aerosol packages.

There is no exact rule as to how much solvent should be used for extracting any given quantity of living flowers. As a generality, an amount of solvent which is four times the weight of the flowers is appropriate. The flowers may be given one, two, or more extractions, or may be given a single extraction with a greater quantity of solvent. This observation also applies to all perfumery materials which may be treated by the method of this invention. For instance, a blended perfume oil may be subjected to three extractions which may be blended to reconstitute the full bouquet of the original blended perfume oil.

The extraction may be conducted at room temperature or at a temperature above or below room temperature. It is also possible to conduct the extraction at a higher temperature, then after the extraction subject the solvent to a lower temperature and filter out whatever precipitates may be formed. Purer concentrates are produced by extracting at a temperature which is at least as high as room temperature, then chilling the solution preferably to a temperature in the range of about $+10°$ C. and $-25°$ C.

Although, as indicated, there is no single extracting technique which must be followed in all cases or which necessarily provides the best results in all cases, a very simple technique may be utilized in most cases. According to this technique, the perfumery material which is to be concentrated is brought into intimate contact with the solvent, for instance, by agitation at a temperature of substantially 70° F. for a period of about one-half hour. The resulting mixture is then allowed to stand at room temperature for a period of 12 or 16 hours, for instance, overnight, at room temperature. The undissolved portion of the perfumery material usually rises to the top. This settling provides an unexpected gravity separation of the undissolved material from the solution. The solution may then be drawn off. Next, the pressure is reduced to atmospheric pressure which distills off the solvent and leaves the extracted perfumery material as a concentrated residue. In the examples which follow, this technique will be referred to as "standard procedure."

The plant and floral concretes which are produced by the process of this invention may be used in any one of several ways. They may be combined into finished products of the type in which concretes are presently used; they may be refined to very pure absolutes by extraction with ethyl alcohol; or they may be utilized in an aerosol package, either in the same solvent which was used for extraction, or in a different propellent of similar solvent characteristics.

The perfumery concentrates of this invention are particularly effective when applied as an aerosol mist. The aerosol spray accomplishes a very fine division of particles and a dissemination of the particles in the air, or on a surface such as the skin, which produce an esthetic effect which is different from that produced by alcoholic tincture perfume. The method of extracting the fragrance and the method of disseminating the essence combine to produce a pleasing physiological effect. The floral fragrances suggest the immediate presence of living flowers.

Examples of the practice of the process of this invention are provided in the following table:

EXAMPLE 1

| Perfumery material treated | Extractant material and amount | Technique utilized | Result |
| --- | --- | --- | --- |
| Hyacinth flowers (Hyacinthus orientalis), 15 g. | Freon-114, 150 g., 13 p.s.i.g. | Extracted for 30 minutes at 70° F. at a pressure of 13 p.s.i.g., cooled to 10° F. and filtered. Extractant distilled off. | Recovered 0.02 g. of concrete hyacinth, a yield of 0.13% based upon the amount of flowers. The obtained concrete has an excellent odor of the living flower. |

EXAMPLE 2

| Lilac flowers (Syringa vulgaris), 115 g. | Freon-114, 230 g., 35 p.s.i.g. | Extracted for 35 minutes at 104° F. Cooled in freezer for 2 hours (5° F.), and filtered. After distillation of the extractant concrete obtained. | Recovered 0.35 g. of concrete, a yield of 0.3%. The odor of the concrete remains unchanged and has the typical fragrance of lilac. |
| --- | --- | --- | --- |

EXAMPLE 3

| Lily of the Valley flowers (Convallaria majalis), 30 g. | Freon-114, 100 g., 13 p.s.i.g. | Extracted for 30 minutes at 70° F., cooled to 0° F. and filtered. Freon distilled off. | Recovered 0.045 g. of yellow-green concrete, a yield of 0.15%. Odor same as of the flower. |
| --- | --- | --- | --- |

EXAMPLE 4

| Gardenia flowers (Gardenia grandiflora) 30 g. | Freon-114, 90 g., 13 p.s.i.g. | Extracted for 30 minutes at 70° F., cooled to about 5° F. and filtered. Freon distilled, concrete obtained. | Recovered 0.015 g. concrete, a yield of 0.05%. Extremely strong odor of living gardenia flower. |
| --- | --- | --- | --- |

EXAMPLE 5

| Rose flowers (Rose damascena) 200 g. | Freon-114 600 g., 13 p.s.i.g. | Extracted for 30 minutes at 70° F., cooled for 4 hours in freezer to 0° F. Filtered and Freon-114 distilled off. | Recovered 0.225 g. of rose concrete, a yield of 0.1125%. Excellent fragrance as in natural living flower. |
| --- | --- | --- | --- |

EXAMPLE 6

| Rose flowers (Rose centifolia), 157 g. | Freon-114, 1,000 g., 13 p.s.i.g. | Extracted for 30 minutes at 70° F., cooled for 4 hours in freezer to 0° F. Filtered and Freon-114 distilled off. | Recovered 0.07 g. of concrete, a yield of 0.05%. Same odor as in the living extracted flower. |
| --- | --- | --- | --- |

EXAMPLE 7

| Honeysuckle flowers (Lonicera), 170 g. | Freon-114, 840 g., 13 p.s.i.g. | Extracted for 30 minutes at 70° F., cooled for 4 hours in freezer to 0° F. Filtered and Freon-114 distilled off. | Recovered 0.35 g. of a yellow concrete, a yield of 0.2%. Yellow paste with a strong odor of fresh honeysuckle flowers obtained. |
| --- | --- | --- | --- |

EXAMPLE 8

| Perfumery material treated | Extractant material and amount | Technique utilized | Result |
|---|---|---|---|
| Grass, 75 g. | Freon-114, 130 g., 13 p.s.i.g. | Grass was crushed, 75 g. extracted at 70° F. for 30 minutes, cooled to about 10° F., filtered and Freon distilled off. | Recovered 0.07 g., a yield of 0.1%. Had an odor of fresh cut grass. (Color of concrete yellow.) |

EXAMPLE 9

| Lilac leaves, 33 g. | Freon-114, 75 g., 13 p.s.i.g. | Leaves crushed. 33 g. extracted at 70° F. for 30 minutes with Freon-114. Cooled to about 10° F., filtered and Freon distilled off. | Recovered 0.03 g., yellowish concrete, a yield of 0.1%. Odor of green leaves obtained. |
|---|---|---|---|

EXAMPLE 10

| Abs. *Resinoid castoreum*, 10 g., black paste. | Freon-11, 75 g., 20 p.s.i.g. | Extracted for 30 min. at 122° F. and followed standard procedure. | Recovered a 3 g. of concentrate, a yield of 30.0%. Light reddish-yellow liquid with *castoreum* odor. |
|---|---|---|---|

EXAMPLE 11

| Abs. Immortelle, 10 g., black paste. | Freon-114, 75 g., 32 p.s.i.g. | Extracted for 30 min. at 100° F. and followed standard procedure. | Recovered 3.3 g. of concentrate, a yield of 33.0%. Yellow colored liquid of excellent odor. |
|---|---|---|---|

EXAMPLE 12

| Abs. Mousse de Chene (Yugoslave) (Abs. Oak Moss), 10 g., very dark black-green paste. | Genetron-142B, 75 g., 30 p.s.i.g. | Extracted for 30 min. at 70° F. and followed standard procedure. | Recovered 5.2 g. of concentrate, a yield of 52.0%. Green colored liquid with Mousse de Chene odor. |
|---|---|---|---|

EXAMPLE 13

| Abs. Resin Styrax (American), 10 g., medium brown paste. | Freon-12, 90 g., 70 p.s.i.g. | Extracted for 30 min. at 70° F. and followed standard procedure. | Recovered 1.8 g. of concentrate, a yield of 18.0%. Very light yellow product of higher viscosity than obtained with No. 114. Odor of Resin Styrax. |
|---|---|---|---|

EXAMPLE 14

| Abs. Eau Fleurs d' Oranger, 10 g., very dark red-brown liquid. | Freon-114, 75 g., 13 p.s.i.g. | Extracted for 30 min. at 70° F. and followed standard procedure. | Recovered 8.9 g. of concentrate, a yield of 89.0%. Light brown liquid with a very fine odor of the original. |
|---|---|---|---|

EXAMPLE 15

| Essence Costus, 10 g., brown oily liquid. | Freon-114, 75 g., 13 p.s.i.g. | Extracted for 30 min. at 70° F. and followed standard procedure. | Recovered 5.3 g. of concentrate, a yield of 53.0%. Very light yellow almost colorless liquid of a very good Costus fragrance (not oily). |
|---|---|---|---|

EXAMPLE 16

| Abs. Mousse de Chene (Yugoslave) (Abs. Oak Moss), 10 g., very dark black-green paste. | Freon-114, 75 g., 13 p.s.i.g. | Extracted for 30 min. at 70° F. and followed standard procedure. | Recovered 1.6 g. of concentrate, a yield of 16.0%. Light yellow liquid of stronger and finer odor than original substance. |
|---|---|---|---|

EXAMPLE 17

| Balsam Peru, dark brown viscous liquid, 10 g. | Freon-114, 75 g., 13 p.s.i.g. | Extracted for 30 min. at 70° F. and followed standard procedure. | Recovered 1.5 g. of concentrate, a yield of 15.0%. Colorless liquid with stronger odor than original. |
|---|---|---|---|

EXAMPLE 18

| Abs. Resin Styrax (American), 10 g., medium brown paste. | Freon-114, 83 g., 13 p.s.i.g. | Extracted for 30 min. at 70° F. and followed standard procedure. | Recovered 1.25 g. of concentrate, a yield of 12.5%. Colorless liquid with stronger odor than original. |
|---|---|---|---|

EXAMPLE 19

| Abs. Jasmin, 10 g., reddish-brown liquid. | Freon-114, 90 g., 13 p.s.i.g. | Extracted for 30 min. at 70° F. and followed standard procedure. | Recovered 8 g. of concentrate, a yield of 80.0%. Light yellow-brown liquid with finer and lighter odor than original. Residue dark brown. |
|---|---|---|---|

EXAMPLE 20

| Abs. Fleurs d'Oranger., 10 g., very dark brown liquid. | Freon-114, 75 g., 13 p.s.i.g. | Extracted for 30 min. at 70° F. and followed standard procedure. | Recovered 7.8 g. of concentrate, a yield of 78.0%. Light reddish-brown liquid with very fine odor of same general character as original. |
|---|---|---|---|

EXAMPLE 21

| Perfumery material treated | Extractant material and amount | Technique utilized | Result |
|---|---|---|---|
| Abs. Civet, 10 g., very dark brown-red liquid. | Freon-114, 75 g. 13 p.s.i.g. | Extracted for 30 min. at 70° F. and followed standard procedure. | Recovered 4.3 g. of concentrate, a yield of 43.0%. Almost colorless liquid which not discolor in a period of one month. Odor much finer than original substance and no unpleasant protein deterioration odor as with original. |

EXAMPLE 22

| Abs. Lavender, 10 g., very dark green, almost black liquid. | Freon-114, 75 g. 13 p.s.i.g. | Extracted for 2 hrs. at 70° F. and followed standard procedure. | Recovered 9.2 g. of concentrate, a yield of 92.0%. Very light green liquid with less spicy odor than original. |
|---|---|---|---|

EXAMPLE 23

| *Resinoid castoreum*, 10 g., black paste. | Freon-114, 75 g., 32 p.s.i.g. | Extracted for 30 min. at 100° F. and followed standard procedure. | Recovered 0.6 g. of concentrate, a yield of 6.0%. Yellow color with excellent quality odor. |
|---|---|---|---|

EXAMPLE 24

| Abs. Oak Moss, 5 g., very dark black-green paste. | Freon-C318, 38 g., 25 p.s.i.g. | Extracted for 30 min. at 70° F. and followed standard procedure. | Recovered 0.05 g. of concentrate, a yield of 1.0%. Very light yellow liquid with very strong odor of original substance. |
|---|---|---|---|

EXAMPLE 25

| Abs. Jasmine, reddish brown liquid, 5 g. | Freon-C318, 38 g., 25 p.s.i.g. | Extracted for 30 min. at 70° F. and followed standard procedure. | Recovered 0.2 g. of concentrate, a yield of 4%. Light yellow liquid with very strong odor of original substance. |
|---|---|---|---|

EXAMPLE 26

| Abs. Civet, 5 g., very dark brown-red liquid. | Freon-C318, 38 g., 25 p.s.i.g. | Extracted for 30 min. at 70° F. and followed standard procedure. | Recovered 0.05 g. of concentrate, a yield of 1.0%. Colorless liquid with very strong odor of original substance. |
|---|---|---|---|

EXAMPLE 27

| Balsam Peru USP, 20 g. | Freon-12, 128 g., 70 p.s.i.g. | Extracted for 2 hours at 70° F. and followed standard procedure. | Recovered 4.35 g. of concentrate, a yield of 21.75%. Light yellow oil. Odor more like Balsam Peru. |
|---|---|---|---|

EXAMPLE 28

| Resin Styrax (American), 10 g. | Freon-113, 20 g. and Freon-114, 60 g., 8 p.s.i.g. | Extracted for 30 min. at 70° F. and followed standard procedure. | Recovered 1.8 g. of concentrate, a yield of 18%. Odor of oil styrax colorless liquid. |
|---|---|---|---|

EXAMPLE 29

| Resin Styrax (American), 10 g. | Freon-11, 20 g. and Freon-114, 60 g., 12 p.s.i.g. | Extracted for 30 min. at 70° F. and followed standard procedure. | Recovered 2.4 g. of concentrate, a yield of 24%. Odor of resin styrax almost colorless liquid. |
|---|---|---|---|

EXAMPLE 30

| *Resinoid castoreum*, 10 g. | Freon-12, 90 g., 120 p.s.i.g. | Extracted for 30 min. at 100° F. and followed standard procedure. | Recovered 1.2 g. of concentrate, a yield of 12%. Yellow color. Odor quality good. |
|---|---|---|---|

EXAMPLE 31

| Mousse de Chene (Abs. Oak Moss) (Yugoslave), 20.5 g., black paste. | Freon-115, 140 g., 90 p.s.i.g. | Extracted for 30 min. at 70° F. and followed standard procedure. | Recovered 0.4 g. of concentrate, a yield of 2.0%. Stronger odor than abs. Oak Moss. Even stronger than extracted with No. 114. |
|---|---|---|---|

EXAMPLE 32

| Abs. Jasmine, 10 g., reddish brown liquid. | Freon-115, 75 g., 90 p.s.i.g. | Extracted for 30 min. at 70° F. and followed standard procedure. | Recovered 0.5 g. of concentrate, a yield of 5.0%. Very light yellowish colored liquid, very strong and beautiful odor of Abs. Jasmine. |
|---|---|---|---|

EXAMPLE 33

| Abs. Mousse de Chene (Abs. Oak Moss Yugoslave), 10 g., very dark black-green paste. | Freon-114, 45 g. and Freon-12, 25 g., 40 p.s.i.g. | Extracted for 30 min. at 70° F. and followed standard procedure. | Recovered 2.15 g. of concentrate, a yield of 21.5%. Light yellow liquid with a very strong odor of Mousse de Chene. |
|---|---|---|---|

EXAMPLE 34

| Perfumery material treated | Extractant material and amount | Technique utilized | Result |
|---|---|---|---|
| Resin Styrax (American), 10 g. | Freon-11, 70 g., 0 p.s.i.g. | Extracted for 30 min. at 70° F. and followed standard procedure. | Recovered 7.3 g. of concentrate, a yield of 73%. Yellow liquid, odor of resin styrax. |

EXAMPLE 35

| | | | |
|---|---|---|---|
| Balsam Peru, 10 g., very dark brown, heavy liquid. | Freon-11, 75 g., 20 p.s.i.g. | Extracted for 30 min. at 122° F. and followed standard procedure. | Recovered 6.2 g. of concentrate, a yield of 62.0%. Light yellow liquid with the odor of Peru Balsam. |

EXAMPLE 36

| | | | |
|---|---|---|---|
| Abs. Resinoid Benzoin (Siam), 10 g., brown solid substance. | Freon-11, 75 g., 39 p.s.i.g. | Extracted for 30 min. at 150° F. and followed standard procedure. | Recovered 2.1 g. of concentrate, a yield of 21.0%. Very light brown crystalline product of benzoin odor. |

EXAMPLE 37

| | | | |
|---|---|---|---|
| Abs. Oak Moss Yugoslave, 20 g., very dark black-green paste. | Freon-12, 150 g., 136 p.s.i.g. | Extracted for 30 min. at 110° F. and followed standard procedure. | Recovered 4.2 g. of concentrate, a yield of 21.0%. Light yellow liquid of a very strong oak moss odor. |

EXAMPLE 38

| | | | |
|---|---|---|---|
| Abs. Civet, 10 g., very dark brown-red liquid. | Genetron-114-A, 75 g., 13 p.s.i.g. | Extracted for 30 min. at 70° F. and followed standard procedure. | Recovered 5.7 g. of concentrate, a yield of 57%. Almost colorless liquid. Odor much finer than original. |

EXAMPLE 39

| | | | |
|---|---|---|---|
| Abs. Mousse de Chene (Abs. Oak Moss Yygoslave), 10 g., very dark black-green paste. | Genetron-114-A, 75 g., 13 p.s.i.g. | Extracted for 30 min. at 70° F. and followed standard procedure. | Recovered 1.6 g. of concentrate, a yield of 16%. Light yellow liquid of stronger odor than the original substance. |

EXAMPLE 40

| | | | |
|---|---|---|---|
| Abs. Mousse de Chene (Abs. Oak Moss Yugoslave), 10 g., very dark black-green paste. | Freon-113, 80 g., 0 p.s.i.g. | Extracted for 30 min. at 70° F. and followed standard procedure. | Recovered 3.5 g. of concentrate, a yield of 35%. Yellow-green colored liquid with a strong Mousse de Chene odor. |

EXAMPLE 41

| | | | |
|---|---|---|---|
| Perfume oil:<br>0.5 Resinoid Labdanum<br>0.5 Vetiver bourbon<br>1.0 Sandalwood E.I.<br>1.0 Patchouly<br>1.5 Coumarin<br>2.0 Abs. Mousse de Chene Yugoslave<br>3.5 Bergamot<br>———<br>10.0 grams | Freon-114, 100 g., 13 p.s.i.g. | Extracted for 30 min. at 70° F. and followed standard procedure. | Recovered 6.3 g. of concentrate, a yield of 63%. Light yellow liquid with a much finer and stronger odor than the original oil. |

EXAMPLE 42

| | | | |
|---|---|---|---|
| Perfume oil E-3030, yellow liquid, 20 g. | Freon-114, 130 g., 13 p.s.i.g. | Extracted for 30 min. at 70° F. and followed standard procedure. | Recovered 16 g. of concentrate, a yield of 80%. Very light yellow liquid with a finer and stronger odor than the original oil. |

EXAMPLE 43

| | | | |
|---|---|---|---|
| Perfume oil E-3383, 20 g., black-green liquid. | Freon-114, 130 g., 13 p.s.i.g. | Extracted for 30 min. at 70° F. and followed standard procedure. | Recovered 13 g. of concentrate, a yield of 65%. Light yellow liquid with a finer and stronger odor than the original oil. |

EXAMPLE 44

| | | | |
|---|---|---|---|
| Concrete Lavandin, 10 gr., black-green viscous liquid. | Freon-114, 75 gr., 13 p.s.i.g. | Extracted for 30 min. at 70° F. and followed standard procedure. | Recovered 7.9 gr. of concentrate, a yield of 79%. Dark green liquid, lighter in color than the original and of an excellent odor value. |

EXAMPLE 45

| | | | |
|---|---|---|---|
| Concrete Orris, 10 gr., light yellow solid product, which melts at about 100° F. | Freon-114, 75 gr., 32 p.s.i.g. | Extracted for 30 min. at 100° F. and followed standard procedure. | Recovered 2.3 gr. of concentrate, a yield of 23%. Product almost white with a very fine odor of Orris, much finer than original. |

EXAMPLE 46

| Perfumery material treated | Extractant material and amount | Technique utilized | Result |
|---|---|---|---|
| Concrete Geranium, black-green paste, 10 gr. | Freon-114, 75 gr., 32 p.s.i.g. | Extracted for 30 min. at 100° F. and followed standard procedure. | Recovered 3.9 gr. of concentrate, yield of 39%. Green paste less colored than original substance, with a very fine odor of Geranium. |

The foregoing examples disclosed the treatment of four classes of commercial materials which are used in the perfume industry. The first class is constituted by raw materials, such as living flowers. The other three classes are perfume concentrates, that is, concretes, absolutes and blended perfume oils. In each case, the treatment results in an extract and a residue. The extract is preferably in the form of an optically clear solution although for some purposes, as later explained, a colloidal solution or dispersion will suffice.

In the treatment of living flowers, the residue includes various undersirable chemical substances which occur in the extract if petroleum ether is used for the extraction. Some of these components persist in the absolutes. If a pure fluorinated hydrocarbon is used for the extraction, then these undersirable components are excluded, because the oil, which in the past has been regarded as a whole perfume oil, is not soluble as a whole in a fluorinated hydrocarbon. At best, there is only partial compatibility between the conventional perfume extracts and concentrates and a pure fluorinated hydrocarbon. However, the residue or dregs or raff or excluded fraction or portion of the conventional perfume concentrate is not only useless as fragrance but in many cases definitely undesirable. In general, the fragance extracted from the living flower is closer to the fragance of the living flower if the aromatically superfluous compounds are excluded from the extraction. Thus the fragrance is optimum when extracted with pure fluorinated hydrocarbon.

The foregoing examples do not include all possible operating conditions. The extraction of the living flowers may be made at temperatures as low as a few degrees above freezing and may be made up to temperatures at which the living flowers are darkened, i.e., the temperature at which the metabolic processes cease. From the point of view of obtaining the finest fragrances, the temperature of the extraction and its duration should be in the ranges in which the metabolic processes are proceeding.

As a matter of convenience, the fragrance may be treated with a fluorinated hydrocarbon at room temperature (70° F. or slightly above). In fact, the entire process may be conducted at about room temperature. However, it is considered preferable to lower the temperature below the freezing point of water, for instance to 5° F. These lower temperatures tend to freeze any water particles or particles of acqueous compound which may be dispersed in the solvent. If desired, the solvent may be drawn from or pressed from the flowers and the solution permitted to settle. Preferably, however, the solution is filtered to insure the removal of pollen and all other particles which are not in solution. The solution so obtained is an optically clear solution of the essence of the fragrance in fluorinated hydrocarbon.

If the fragrance extracted from the living flowers is to be used in an aerosol package, the solvent must consist essentially of fluorinated hydrocarbon. Relatively small amounts of secondary solvent may be present without substantially affecting the solvency of the fluorinated hydrocarbon but larger amounts of secondary solvent render the fragrance unsuitable for aerosol packaging.

Possible secondary solvents include iso-propyl myristate, di-ethyl phthalate, methanol, ethyl alcohol, iso-propyl alcohol, hercolyn (hydrogenated methyl ester of rosin), petroleum ether, benzene (benzol), and acetone. These solvents dissolve in the fluorinated hydrocarbons and in turn dissolve the ethereal perfume oils. They are compatible with both. The foregoing list is but a partial list of the solvents which may be used as secondary solvents.

In general, if secondary solvents are used in the treatment of the raw materials of the perfumery industry, the yield of the extract is increased but the undesirable components of the raw material are excluded to a lesser degree. Further, the use of substantial quantities of secondary solvents results in the formation of colloidal solutions which do not settle readily. The presence of the colloidal solutions in the aerosol packages results in latent precipitation, perhaps weeks or months after packaging. This latent precipitation may interfere with the operation of the valve mechanism of the aerosol package.

There is no absolutely sharp line of demarcation which precisely limits the amount of secondary solvent which may be present without impairing the results desired, if the product is to be used for aerosol packaging. In general, the amount of secondary solvent should be below 10% and preferably below 5% by weight of the amount of fluorinated hydrocarbon. The presence of a small amount of secondary solvent of the order specified does not seem to change the essential solvent charactertistics of the fluorinated hydrocarbon. In such small amounts the secondary solvents do not appear to modify the extraction process one way or the other.

If the fragrance being extracted from the raw materials of the perfume industry, such as living flowers, is to be used in alcoholic solution as is conventional, the secondary solvents may be used in much greater quantities. The use of the larger quantities of secondary solvents tends to increase the yield, i.e., the concentration of the fragrance in solution but at the expense of the vitality of the fragrance and often at the expense of color. Nevertheless, there may be cases where, as a matter of economics, it is worthwhile to increase quantity at the expense of quality. Hence, secondary solvents may be used to extract fragrances which are stronger and lighter color than the conventional absolutes of commerce but which are less pure than corresponding products extracted with pure fluorinated hydrocarbons. In such cases, it may be said that the secondary solvent is used to increase the solvency of the fluorinated hydrocarbon or that the fluorinated hydrocarbon is used to decrease the solvency of the secondary solvent. However expressed, the point is that the solvency of fluorinated hydrocarbons is very selective; the components of the material treated which constitute the essence of the fragrance dissolve in the fluorinated hydrocarbons and the aromatically superfluous components are not dissolved by the fluorinated hydrocarbons.

Inasmuch as perfume fragrances include a substantial variety of individual chemical substances and inasmuch as the nature of their effect upon the olfactory centers is not understood, the selective solvency of the fluorinated hydrocarbons cannot be explained as a matter of chemical theory but must stand as a fact established by empirical observation.

It is to be noted that the foregoing examples include the extraction of fragrances from lilacs and lilies of the valley. Neither of these fragrances is susceptible to successful extraction by methods available in the past. Hence, the concentrates which are obtained from lilacs and lilies of the valley by extraction with fluorinated hydrocarbons constitute new natural fragrances.

If desired, the raw perfumery materials such as living flowers may be subjected to a second treatment with fluorinated hydrocarbon to obtain a greater yield of fragrance. In general, the second extract does not produce a fragrance of substantially different odor value from that of the first extract. Where there is a discernible difference, the two fractions may be used separately for their distinctive odor values or they may be combined to complete the fragrance of the starting material. If desired, conventional solvents may be used for the second or third extraction in order to salvage the greatest possible amount of available fragrance.

The treatment of the perfume concentrates of commerce by the herein disclosed method also provides very much improved fragrances. These concentrates include the concretes, absolutes and blended perfume oils which are produced by conventional methods. These concentrates may be purified and their solvencies may be modified by extractions with fluorinated hydrocarbons. The resulting purified products may be used in alcoholic solutions, as is conventional, or in aerosol packages. If the product is to be used in an aerosol package, then the solvent with which it is treated should be essentially a fluorinated hydrocarbon. If, however, the product is to be used in alcoholic solution, then the fluorinated hydrocarbon is used to exclude undesirable components and need not be used in as high proportions as if aerosol packaging were contemplated. The permissive use of secondary solvents has been explained in relation to the treatment of living flowers and the same observations hold true in respect to the treatment of the perfume concentrates.

In treating the perfume concentrates, the solvent is selected or blended so that it is not compatible with the perfume concentrate as a whole. That is, the perfume concentrate and solvent are only partially compatible. This invention is based on the concept of exploiting the incompatibility of perfume concentrates and fluorinated hydrocarbons for the purpose of eliminating and discarding undesired components of the perfume concentrates with enhancement of the fragrance value of the recovered product.

The physical chemistry of the process may be best observed when conducted on a small scale in laboratory glass equipment, although the same phenomena go on if commercial equipment is used. A typical demonstration of the process may be conducted as follows:

About 7½ parts of Freon-114 is introduced into a pressure tight container. One part by weight of the perfume oil, substantially alcohol free, is mixed into the Freon-114 and the mixture is agitated violently for a period of about 10 or 15 minutes. The container is then brought to rest and the contents permitted to settle. Almost immediately a darker colored layer of liquid forms on top of the Freon-114. Below this layer is a milky dispersion of those parts of the perfume oil which have not separated from the solvent. If the container is permitted to stand overnight, the lower milky dispersion clarifies. A darker and more viscous layer of insoluble material forms on top leaving below a solution which to the eye is optically clear.

An analysis of the demonstration discloses that during the period of violent agitation, there is a three-phase mixture of the perfume concentrate and the Freon-114. During the agitation the three phases are co-mingled. The first phase may be said to be constituted by components of the perfume concentrate which are actually dissolved in the Freon-114. The second phase is a fine slow settling colloidal dispersion of components of the perfume concentrate in Freon-114. The third phase is a loose or coarse mixture of rapidly separating droplets of insoluble components of the perfume concentrate in Freon-114. On standing, the coarse droplets coalesce and rise rapidly to provide a darker upper layer. Over a period of time, the colloidal dispersion resolves itself by settling and the dispersed particles dissolve in the upper layer leaving the lower layer a clear solution.

If the extract from the concrete or the absolute or the blended perfume oil is to be ultimately used in an aerosol package, then it is necessary that the colloidal dispersion be completely resolved by filtration or by separation based on differences of specific gravity (gravity separation) which may be accomplished by settling or centrifuging. If, on the other hand, an absolute or a blended perfume oil is being treated and the ultimate product is to be used in alcoholic solution, then the colloidal dispersion may in many cases be included in the recovered product instead of in the rejected residue. Inasmuch as absolutes and blended perfume oils are by definition soluble in alcohol, then solubility of the refined product in alcohol is not lessened by the inclusion of the material dispersed in the colloidal phase in the recovered oil. However, the droplets which coalesce and rise rapidly to the surface promptly after the cessation of agitation usually are much darker in color than the original product treated and are darker in color than the recovered product. Hence, if the refined absolute or refined perfume oil is to go ultimately into alcoholic solution, the color may be substantially improved merely by removal of those components of the absolute or blended perfume oil which neither dissolve in the fluorinated hydrocarbon or disperse colloidally therein. Further, this least soluble fraction, which separates relatively promptly as a discrete upper layer, is believed to contain that portion of the material treated which is least contributary to fragrance and which may exercise an actual inhibitory affect on the fragrance of the more aromatic components of the starting material.

As pointed out, the refining of concretes, absolutes, and blended perfume oils for ultimate use in aerosol packages requires the use of a solvent which is essentially a fluorinated hydrocarbon, but refining these products for ultimate use in alcoholic solution merely requires the use of enough fluorinated hydrocarbon to exclude a portion or a fraction of the material treated, for instance, the darker colored fraction. In such cases, the presence of a stubborn colloidal dispersion of the less than soluble components of the material treated is no disadvantage. Hence, in refining the materials of the classes specified, substantial quantities of alcohol (or any other secondary solvent) may be used.

The finished packaged perfumes of commerce usually contain 20% perfume oil and 80% perfumery grade alcohol. Even so diluted, the alcoholic solution of perfume oil may be treated with an equal or greater quantity of fluorinated hydrocarbon with some separation of superfluous components of the perfume oil. (In practice, relatively large quantities of fluorinated hydrocarbons and repeated extractions are recommended for best results.) If the perfume oil under treatment was originally a relatively darker colored perfume oil, then the color fraction separates. In any case, however, the separating fraction is relatively inert aromatically and hence may be regarded as a diluent or adulterant which was inherently and accidentally present, more than by extraction.

If substantial quantities of alcohol are used in the refining process, the speed of the formation of the initial top layer may be retarded somewhat due to the fact that alcohol has a substantially lower specific gravity than pure fluorinated hydrocarbon and hence reduces the specific gravity of the solvent. Nevertheless, the incompatibility of certain components of the perfume oil and fluorinated hydrocarbon is such that stratification of an upper layer occurs relatively promptly. As a practical matter, the amount of alcohol which is permissive and which is optimum must be determined in relation to each specific material under treatment.

In the foregoing examples, a single extraction of the perfume material is disclosed and in each case a fractionation occurs between the fragrant portion of the material treated and the inert material which is removed as residue. In some cases, it is desirable to utilize the product of a single extraction as a component of the ultimate perfume oil, but, in other cases, it is desirable to subject the residue to a second extraction. If desired, the residue from the second extraction may be subjected to a third extraction, etc. Each of the extractions has a different odor value which may be slight or significant, and hence each extraction may be used for its individual value, or the extractions may be blended to reconstitute the full odor value of the material treated.

While it may be desirable to use the extractions individually in compounding new blended perfumes of distinctive individuality, multiple extractions should be used for the purification of established perfume oils, the distinctive odor of which is their trademark. In the purification of such perfume oils, the maintenance of the exact fragrance is the desideratum and no refining process is permissive if it changes the fragrance.

Heretofore, it has been considered impossible to package the prestige perfumes either as perfumes or colognes in aerosol packages. These perfume oils are alcoholic solutions or dilutions of a great variety of the perfume absolutes and perfumery raw materials which are commodities of commerce. A great variety of absolutes and perfumery raw materials in varying proportions are blended into a complete perfume oil and it is the choice of these materials and their proportioning which provides distinctive odor of the finished perfume. There are many blended perfume oils which are not fully soluble in fluorinated hydrocarbons and the fraction which does go into solution does not necessarily provide the distinctive odor of the starting perfume oil. Further, the alcoholic solutions of many perfume oils do not form stable solutions in fluorinated hydrocarbons and precipitation occurs over a period of time, thereby making the alcoholic solution unsuitable for use in an aerosol package.

The method of our invention may be utilized for packaging perfumes in aerosol containers either as perfumes or colognes without sedimentation or the sacrifice of distinctive fragrance of the blended perfume oil.

In preparing an aerosol packaged cologne, the alcohol is removed from the blended perfume oils. It is not necessary to remove absolutely all of the alcohol but the amount remaining in the blended perfume oils should not be over 50% by weight, and preferably is substantially less. As previously indicated, the presence of alcohol increases the apparent solubility of the perfume in the fluorinated hydrocarbon but tends to make fractionation less sharp. Hence, if any significant amount of alcohol is used, the mixture of alcohol and fluorinated hydrocarbon not only extracts components of the perfume which are truly soluble in the solvent mixture, but also components which form an unstable colloidal solution in the mixture. If the undissolved components are not removed before packing the product in aerosol containers, they tend to precipitate latently during the shelf life of the product, which is undesirable. Hence, the amount of alcohol present is reduced at least to the point where no stubborn colloidal solution is formed which might result in latent precipitation.

After the removal of the alcohol, the perfume oil is agitated at room temperature with about 5 to 10 parts by weight of Freon–114. About 7½ parts by weight is recommended. The perfume oil is thoroughly dispersed in the solvent by agitation for a period of a half-hour or more, the exact time depending upon the efficiency of the agitating equipment. The purpose of the agitation is to obtain the highest possible degree of dispersion and the breaking up of the perfume oil into the smallest possible particles. This step of the process is important and should be conducted in a manner and/or for a length of time to secure maximum dispersion of the perfume oil in the Freon–114.

The next step of the process is to remove from the colloidal dispersion all components thereof which are not actually dissolved or dispersed quasi-permanently, i.e., those which will separate in time. This resolution of the colloidal dispersion may be accomplished by gravity separation, i.e., settling or centrifuging, the former being the simpler though the slower method. The gravity separation with a typical perfume oil requires a period of at least several hours. For safety, a longer period of settling is recommended for the first extraction, say 16 hours, i.e., overnight. The extract from the first extraction of a typical perfume oil amounts to substantially 50% of the original perfume oil.

We have discovered and determined that the raff or residue from the first extraction is not wholly insoluble in fluorinated hydrocarbons but, on the contrary, contains a substantial amount of fragrant oil which is incipiently soluble in the fluorinated hydrocarbon. Therefore, the residue from the first extraction is again dispersed at room temperature in Freon–114, the amount of which is preferably the same as that used for the first extraction. The steps of the first extraction are duplicated and the extract is separated from the residue. In this case, about 17% of the original perfume oil is extracted.

The residue from the third extraction is then treated with Freon–114, the amount and temperature being the same as that used for the first and second extractions. The residue is dispersed as in the first and second extractions, but a shorter gravity separation period is possible, for instance 10 hours. The residue is then removed. In the third extraction, substantially 8% of the original perfume oil is dissolved.

The three extractions which may be of different odor values are blended together to reconstitute the fragrance of the original perfume oil undergoing treatment.

These three extractions remove all or substantially all of the fragrant oils which were in the original blended perfume oil. While there may be traces of perfume left in the final residue, the amount is insignificantly small.

The formation of the colloidal dispersions and the gravity separations are conveniently conducted at room temperature under appropriate pressure. In no case should the temperatures be over 220° F. The dispersions and gravity separations are retarded by low temperatures and the fluorinated hydrocarbons have less dissolving power which results in greater residue containing valuable odoriferous components. Therefore, it is not expedient to carry out the process at temperatures below 32° F. Room temperatures which may run between 60° F. and 95° F. are both convenient and suitable.

The mixture of the three extracts is then prepared for packaging in aerosol packages. The final cologne should contain about 1½–3% essential oil, about 50% fluorinated hydrocarbon, preferably constituted by a mixture of 45% of Freon–114 and 5% Freon–12 and the balance alcohol. The filling may be accomplished by pressure filling or at a low temperature such as −20° F.

A cologne manufactured as described is completely stable from the point of view of sedimentation over an indefinite period of time at all temperatures to which it may be subjected in storage and shipping, as well as in use. Three fluid ounces of this cologne provides about 1,500 sprays. Being substantially devoid of non-volatile matter, the cologne does not stain or injure the most delicate fabrics. Above all, the cologne has the distinctive fragrance of the original perfume oil, which permits the prestige perfumes to be marketed in aerosol packages without sacrifice of the standardized fragrance of the perfume. Further, the fragrance of the cologne is more rounded and balanced than the fragrance of the starting oil.

In the process of packaging colognes in aerosol containers it is to be observed that alcohol is removed from the perfume oil before the treatments with the fluorinated hydrocarbon and alcohol is added to the perfume oil dissolved in fluorinated hydrocarbon after the critical processing. This final addition of alcohol provides a compound solvent consisting of fluorinated hydrocarbon and alcohol which is a better solvent for the perfume oil than the fluorinated hydrocarbon alone. Therefore, even if the perfume were present in sufficient quantity to form a saturated solution in the fluorinated hydrocarbon at room temperature, the greater solvency imparted by the alcohol addition renders the solution stable at lower temperatures which might be encountered in shipment and storage. The addition of the alcohol does not result in the formation of colloidal solutions of the perfume in the solvent because the extraction of the perfume oil substantially in the absence of alcohol eliminates those components which tend to form colloidal solutions in mixtures of fluorinated hydrocarbons and alcohol.

It is also to be noted in the foregoing examples of the processing of a cologne that the ratio of fluorinated hydrocarbon solvent to perfume oil under extraction is increased from treatment to treatment by maintaining the quantity of solvent used the same through all three treatments. This is not absolutely necessary and lesser quantities of solvent may be used for the second and third extractions. However, it is recommended that the ratio of solvent to oil be increased at least somewhat from extraction to extraction in order to obtain the best yield of soluble perfume oil.

In addition to colognes or toilet waters, genuine perfumes may be packaged in aerosol containers by this process. Perfumes in general require 5 to 30% perfume oil dissolved in the solvent in order to have the proper strength. Perfumes having commercial strengths may be compounded by this process.

The actual process of obtaining the solution of blended perfume oil in fluorinated hydrocarbon may be exactly the same as that used for the preparation of colognes. However, at the end of the process, the solution is too dilute to provide a strong perfume. Hence, it is necessary to remove some of the fluorinated hydrocarbon, which may be done by distillation. This removal of fluorinated hydrocarbon however super-saturates the solution and perfume oil floats out. After the desired concentration of perfume oil in fluorinated hydrocarbon has been reached, the homogeniety of the solution is restored by the addition of an appropriate amount of alcohol. The amount of alcohol added should in all cases be at least equal by weight to the quantity of perfume oil present and, further, should always be sufficient to insure complete solvency of the perfume oil at the lowest temperatures which are apt to be encountered. While it may not be absolutely necessary to avoid any possible precipitation of perfume oil at lower temperatures because of the tendency of the perfume oil to redissolve when the temperature is again elevated, it is believed to be safer practice to use enough alcohol to avoid precipitation at any time.

The term alcohol as used herein, unless otherwise indicated, refers to ethyl alcohol which is preferably anhydrous. However, ethyl alcohol of the purity which is normally used by perfumers, say 96% strength alcohol, may be used for many purposes instead of the anhydrous alcohol, provided the water present does not cause incompatibility in the particular case.

The term fluorinated hydrocarbon refers to all fluorinated hydrocarbons heretofore listed and their equivalents. However, not all of the fluorinated hydrocarbons have exactly the same solvency for perfume oil. The class of solvents which is particularly recommended is the dichlorotetrafluoroethanes of which Freon-114 is representative.

Freon-114 is not the preferred solvent because it is the best fluorinated hydrocarbon solvent for perfume oils, but, on the contrary, because it is a very poor solvent for perfume oils. Freon-114 tends to exclude the undesirable components of the perfume oils which should be eliminated and yet dissolves the fragrant components of the perfume oils. This solvent has an unexplainable capacity to dissolve fragrances and not dissolve associated materials, which cannot be explained by theory, but has been demonstrated by empirical experiment and observation.

Freon-114 is also a good propellent although it is often desirable to mix it for propellent purposes with Freon-12. For most purposes, Freon-12 and Freon-114 are interchangeable or may be used in add mixture. In general, Freon-12 has a slightly higher solvency for perfumery materials which, in some cases, may be desirable and in other cases undesirable. However, Freon-12 requires higher pressures when used as a liquid solvent and is therefore less convenient.

The fluorinated hydrocarbon propellents may be mixed in any manner desired to constitute solvents of particular properties. Also, other fluorinated hydrocarbon propellents or solvents, having substantially equivalent pertinent solvent characteristics, may be used in whole or in part as substitutes for those hereinbefore listed. If a highly pure end product is not necessary or if the end product is to be used in alcoholic solution, the solvency of the fluorinated hydrocarbon solvent may be increased by the use of secondary solvents as hereinbefore discussed. If, on the other hand, a highly pure end product or a product to be used in an aerosol package is desired, then the solvent used should be constituted essentially by a fluorinated hydrocarbon which is a relatively poor solvent for the perfume oil as a whole.

In the latter case, the poor solvent characteristic of the fluorinated hydrocarbon is offset by the use of a very substantial quantity of the poor solvent. In fact, there is no limit to the quantity of solvent which may be used, except the factors which pertain to cost and convenience. The minimum quantity of this type of solvent which must be used varies somewhat with the nature of the material under treatment and with the number of extractions to which the perfume oil is subjected. As indicated, a plurality of extractions with smaller amounts of solvent is very much preferred to a single extraction with a greater amount of solvent. At the least, the amount of solvent should be sufficient in quantity to extract substantially all of the fragrance value of the material under treatment. This involves the use of quantities of solvent which may be in the general range of substantially 10–50 parts solvent by weight to one part of the perfume material. This total quantity of solvent may be used in any desired number of extractions, three being adequate for most purposes. In any case, the total amount of solvent used for the extraction is in excess of the amount of solvent which is required merely to hold the available perfume oil in solution in the solvent.

In summary, the method of this invention may be used to obtain improved perfume materials from raw materials, concretes, absolutes and blended perfume oils. These improved materials may be used in alcoholic perfumes and colognes or aersol perfumes and colognes. The final products are in all cases distinguished by a stronger, purer odor and the absence of inert components and, in most cases, by improved lightness of color.

Having described our invention, we hereby claim:

1. A method of extracting essential perfume fragrance components from substantially non-oleiferous perfumery materials containing said components, said method comprising treating said perfumery materials with a solvent which consists of at least one fluorinated hydrocarbon propellent maintained under sufficient pressure to liquefy said propellent to provide a liquid solvent, the essential fragrance components of said materials being preferentially dissolved in said liquid solvent by said treating to form a solution, and separating the liquid solution from that portion of the perfumery material treated which does not dissolve in said solvent.

2. The method of claim 1 wherein the fluorinated hydrocarbon propellent is a member of the class consisting of dichlorodifluoromethane and dichlorotetrafluoroethane.

3. The method of claim 1 wherein the perfumery material treated is an animal secretion.

4. The method of claim 1 wherein said perfumery material is a living plant material.

5. The method of claim 1 wherein said perfumery material is a plant perfumery material in the form of an absolute.

6. The method of claim 1 wherein said perfumery material is a plant perfumery material in the form of a concrete.

7. The method of claim 1 wherein said perfumery material is a living flower material.

8. A method of manufacturing perfumery concentrates from substantially non-oleiferous perfumery materials, said method comprising mixing said perfumery materials with a solvent which consists of at least one fluorinated hydrocarbon propellent maintained under sufficient pressure to liquefy said propellent to provide a liquid solvent, the desirable fragrances in said materials thereby being extracted from said materials by selectively dissolving in said solvent, and permitting the said mixture to stand for a sufficient period of time to effect a gravity separation of the components of the perfumery material which are not dissolved in the liquid propellent from the solution of the perfumery materials which are dissolved in said solvent.

9. The method of claim 8 wherein the perfumery material is a blended finished perfume oil.

10. The method of manufacturing an improved blended perfume oil from a blended perfume oil consisting essentially of a mixture of perfume absolutes, said method comprising mixing said blended perfume oil with a solvent which consists essentially of at least one fluorinated hydrocarbon propellent maintained under sufficient pressure to liquefy said propellent, the original bouquet components of said oil being selectively dissolved in said propellent and undesirable components of said oil being substantially undissolved in said propellent, and separating the liquid solution from that portion of the perfumery material treated which does not dissolve in the solvent, the total quantity of said liquid propellent mixed with said perfume oil being sufficient to dissolve substantially all of the components of said blended perfume oil which are soluble in said propellent.

11. The method of packaging perfume in an aerosol container, said method comprising subjecting a blended perfume oil to vacuum distillation to remove substantially all of the alcohol therefrom, treating said perfume oil with a solvent consisting essentially of a fluorinated hydrocarbon with which the perfume oil is not as a whole compatible, the amount of fluorinated hydrocarbon being substantially five to ten times the amount of perfume oil by weight, dispersing the perfume oil in the fluorinated hydrocarbon to provide a three-phase intermixture of the perfume oil and fluorinated hydrocarbon, one phase being a mixture of perfume oil droplets in the fluorinated hydrocarbon, another phase being an unstable colloidal solution of components of the perfume oil in the fluorinated hydrocarbon and another phase being a stable solution of components of the perfume oil in the fluorinated hydrocarbon, the essence of the oil being selectively dissolved in the hydrocarbon, the remainder of said oil being substantially rejected from said hydrocarbon, resolving said colloidal dispersion and removing from the fluorinated hydrocarbon all components not in stable solution therein, treating the residue so removed in substantially the manner in which the original perfume oil was treated, combining the perfume oil solutions, dissolving alcohol in the resulting solution to increase the solvency thereof and to stabilize the solution against lower temperatures and packaging the solution in aerosol containers.

12. The method of claim 11 wherein the fluorinated hydrocarbon is a member of the class consisting of dichlorodifluoromethane and dichlorotetrafluoroethane.

13. The method of packaging perfume in an aerosol container, said method comprising subjecting a blended perfume oil to vacuum distillation to remove substantially all of the alcohol therefrom, treating said perfume oil with a solvent consisting essentially of a fluorinated hydrocarbon with which the perfume oil is not as a whole compatible, the amount of fluorinated hydrocarbon being substantially five to ten times the amount of perfume oil by weight, dispersing the perfume oil in the fluorinated hydrocarbon at a temperature of substantially 50–100° F. to provide a three-phase intermixture of the perfume oil and fluorinated hydrocarbon, one phase being a mixture of perfume oil droplets in the fluorinated hydrocarbon, another phase being an unstable colloidal solution of components of the perfume oil in the fluorinated hydrocarbon and another phase being a stable solution of components of the perfume oil in the fluorinated hydrocarbon, at least a portion of the essence of said oil being dissolved in said hydrocarbon, the other components of said oil being substantially undissolved in said hydrocarbon, resolving said colloidal dispersion by gravity separation and removing from the fluorinated hydrocarbon all components not in stable solution therein, treating the residue so removed with a second body of solvent which is not substantially less than the first body of solvent in substantially the manner in which the original perfume oil was treated, combining the perfume oil solutions, dissolving alcohol in the resulting solution to increase the solvency thereof and to stabilize the solution against lower temperatures and packaging the solution in aerosol containers.

14. The method of claim 13 wherein the fluorinated hydrocarbon is a member of the class consisting of dichlorodifluoromethane and dichlorotetrafluoroethane.

15. The method of packaging perfume in an aerosol container, said method comprising subjecting a blended perfume oil to vacuum distillation to remove substantially all of the alcohol therefrom, treating said perfume oil with a solvent consisting essentially of a fluorinated hydrocarbon with which the perfume oil is not as a whole compatible, the amount of fluorinated hydrocarbon being substantially five to ten times the amount of perfume oil by weight, dispersing the perfume oil in the fluorinated hydrocarbon to provide a three-phase intermixture of the perfume oil and fluorinated hydrocarbon, one phase being a mixture of perfume oil droplets in the fluorinated hydrocarbon, another phase being an unstable colloidal solution of components of the perfume oil in the fluorinated hydrocarbon and another phase being a stable solution constituted by desirable fragrance components of the perfume oil dissolved in the fluorinated hydrocarbon, the remainder of said oil being substantially undissolved in said hydrocarbon, resolving said colloidal dispersion and removing from the fluorinated hydrocarbon all components not in stable solution therein, treating the residue so removed in substantially the manner in which the original perfume oil was treated, combining the perfume oil solutions, discharging fluorinated hydrocarbon gas from said solution, adding absolute ethyl alcohol to said solution whereby the resulting solution contains substantially 5–30% perfume oil and at least an equal quantity of alcohol and packaging the solution in aerosol containers.

16. The method of claim 15 wherein the fluorinated hydrocarbon is a member of the class consisting of dichlorodifluoromethane and dichlorotetrafluoroethane.

17. The method of packaging perfume in an aerosol container, said method comprising subjecting a blended perfume oil to vacuum distillation to remove substantially all of the alcohol therefrom, treating said perfume oil with a solvent consisting essentially of a fluorinated hydrocarbon with which the perfume oil is not as a whole compatible, the amount of fluorinated hydrocarbon being substantially five to ten times the amount of perfume oil by weight, dispersing the perfume oil in the fluorinated hydrocarbon to provide a three-phase intermixture of the perfume oil and fluorinated hydrocarbon, one phase being a mixture of perfume oil droplets in the fluorinated hydrocarbon, another phase being an unstable colloidal solution of components of the perfume oil in the fluorinated hydrocarbon and another phase being a stable solution consisting of the essential fragrance components of the perfume oil selectively dissolved in the fluorinated hydrocarbon, resolving said colloidal dispersion and removing from the fluorinated hydrocarbon all components not in stable solution therein, treating the residue so removed in substantially the manner in which the original perfume oil was treated, combining the perfume oil solutions, dissolving alcohol in the resulting solution to increase the solvency thereof and to stabilize the solution against lower temperatures, adjusting the fluorinated hydrocarbon content of said solution so that the solution contains substantially ¼–5.0% perfume oil, substantially 40–60% propellent solvent and the balance alcohol and packaging the solution in aerosol containers.

18. The method of claim 17 wherein the fluorinated hydrocarbon is a member of the class consisting of dichlorodifluoromethane and dichlorotetrafluoroethane.

19. The method of lightening the color and improving the odor of substantially non-oleiferous perfume material concentrates, said method comprising treating said perfume concentrate with an incompatible solvent, consisting essentially of a fluorinated hydrocarbon, the amount of said incompatible solvent being substantially 5–10 times the weight of the perfume concentrate being treated, said treatment consisting of dispersing the perfume concentrate in the solvent to provide a three-phase mixture of perfume concentrate and solvent, one phase being a stable solution consisting of the more desirable fragrance components of said concentrate dissolved in the solvent, a second phase being a slow settling colloidal dispersion of components of the perfume concentrate in the solvent, the third phase being a coarse intermixture of solvent and droplets of components of the perfume conentrate which coagulate rapidly and effecting a physical separation of the first phase from the other two phases.

20. The method of claim 19 wherein the fluorinated hydrocarbon is a member of the class consisting of dichlororifluoromethane and dichlorotetrafluoroethane.

21. The method of refining substantially non-oleiferous purfumery absolute materials and blended perfumery oil materials, said method comprising mixing the perfume material with a fluorinated hydrocarbon and alcohol sufficiently thoroughly to dissolve a portion of the components of the perfume material in the solvent, which is constituted by the fluorinated hydrocarbon and alcohol, the dissolved portion consisting of the original bouquet components of said perfumery materials, and to form a colloidal dispersion of other components of the perfume material in said solvent, permitting the mixture to stand, whereby undissolved and undispersed components of the perfume material form a discrete upper layer relatively promptly, separating the upper layer from the lower layer before the dispersion in the lower layer has resolved to any substantial degree and separating the fluorinated hydrocarbon from the perfumery material and alcohol.

22. The method of refining a substantially non-oleiferous concentrated perfumery material, said method comprising mixing the perfumery material with a fluorinated hydrocarbon, the amount of fluorinated hydrocarbon being in excess of the amount required to hold in solution the available soluble portion of the perfumery material, the essential fragrance components of said material thereby being dissolved in said hydrocarbon and the remainder of said material being rejected by said hydrocarbon, and separating that portion of the perfumery material which dissolves in the fluorinated hydrocarbon from the dispersed phase of perfumery material which does not dissolve in the fluorinated hydrocarbon.

23. The method of claim 22 wherein the fluorinated hydrocarbon is a member of the class consisting of dichlorodifluoromethane and dichlorotetrafluoroethane.

References Cited in the file of this patent

UNITED STATES PATENTS

| | | |
|---|---|---|
| 2,106,200 | Young | Jan. 25, 1938 |
| 2,154,713 | Van Wijk | Apr. 18, 1939 |
| 2,524,590 | Boe | Oct. 3, 1950 |
| 2,564,409 | Rubin | Aug. 14, 1951 |

OTHER REFERENCES

Meunier, C. A., vol. 49, 1955, p. 4947.

Meunier, Soap, Perf. and Cos., vol. 23, August 1950, pp. 827–829.

Dingfelder, Soap and Chem. Specialities, January 1957, pp. 41–43.

Hilfer, Drug and Cosmetic Industry, 75:3, September 1954, pp. 315, 420–421.